United States Patent
Lu et al.

(10) Patent No.: US 11,325,115 B2
(45) Date of Patent: May 10, 2022

(54) VISIBLE-LIGHT RESPONSE HYBRID AEROGEL AND PREPARATION METHOD AND APPLICATION THEREOF IN WASTE GAS PROCESSING

(71) Applicant: SOOCHOW UNIVERSITY, Suzhou (CN)

(72) Inventors: Jianmei Lu, Suzhou (CN); Dongyun Chen, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 418 days.

(21) Appl. No.: 16/509,354

(22) Filed: Jul. 11, 2019

(65) Prior Publication Data
US 2020/0016585 A1 Jan. 16, 2020

(30) Foreign Application Priority Data
Jul. 12, 2018 (CN) .......................... 201810765790.0

(51) Int. Cl.
*B01J 35/10* (2006.01)
*B01D 53/00* (2006.01)
(Continued)

(52) U.S. Cl.
CPC ............ *B01J 35/10* (2013.01); *B01D 53/007* (2013.01); *B01J 6/004* (2013.01); *B01J 27/24* (2013.01);
(Continued)

(58) Field of Classification Search
None
See application file for complete search history.

(56) References Cited

FOREIGN PATENT DOCUMENTS

CN 106268900 A * 1/2017

OTHER PUBLICATIONS

Zhang et al. (Rationally designed 1D Ag@AgVO3 nanowire/graphene/protonated g-C3N4 nanosheet heterojunctions for enhanced photocatalysis via electrostatic self-assembly and photochemical reduction methods, Journal of Materials Chemistry A, 2015) (Year: 2015).*

(Continued)

*Primary Examiner* — Anthony J Zimmer
*Assistant Examiner* — Logan Edward Laclair
(74) *Attorney, Agent, or Firm* — SZDC Law P.C.

(57) ABSTRACT

Visible-light response hybrid aerogel and a preparation method and application thereof in waste gas processing are disclosed. Dicyandiamide is taken as a precursor and is calcined in two times to prepare a carbon nitride nanosheet; the carbon nitride nanosheet is dispersed in water, silver metavanadate quantum dots are subjected to in-situ growth to prepare a silver metavanadate quantum dot/carbon nitride nanosheet composite material; the silver metavanadate quantum dot/carbon nitride nanosheet composite material and graphene oxide carry out hydrothermal reaction, and are then frozen and dried to prepare silver metavanadate quantum dot/carbon nitride nanosheet/graphene hybrid aerogel which is the visible-light response hybrid aerogel. The problems of large reduction dosage, serious secondary pollution, complexity in operation and the like generated when waste gas is processed by a traditional flue gas denitration technology are overcome.

15 Claims, 4 Drawing Sheets

(51) Int. Cl.
*B01J 6/00* (2006.01)
*B01J 27/24* (2006.01)
*B01J 35/00* (2006.01)
*B01J 37/04* (2006.01)
*B01J 37/08* (2006.01)
*B01J 37/32* (2006.01)
*B82Y 20/00* (2011.01)
*B82Y 30/00* (2011.01)

(52) U.S. Cl.
CPC ............. *B01J 35/004* (2013.01); *B01J 37/04* (2013.01); *B01J 37/08* (2013.01); *B01J 37/32* (2013.01); *B01D 2258/0283* (2013.01); *B82Y 20/00* (2013.01); *B82Y 30/00* (2013.01)

(56) References Cited

OTHER PUBLICATIONS

Simón et al (Effects of freeze-drying conditions on aerogel properties, Journal of Material Science, 2016) (Year: 2016).*

* cited by examiner

VISIBLE-LIGHT RESPONSE HYBRID AEROGEL AND PREPARATION METHOD AND APPLICATION THEREOF IN WASTE GAS PROCESSING

This application claims priority to Chinese Patent Application No.: 201810765790.0, filed on Jul. 12, 2018, which is incorporated by reference for all purposes as if fully set forth herein.

FIELD OF THE INVENTION

The present invention relates to the technical field of nano composite materials, in particular to a visible light response silver metavanadate quantum dot/carbon nitride nanosheet/graphene hybrid aerogel and its preparation and application in exhaust gas treatment.

TECHNICAL BACKGROUND

In recent years, the rapid increase of global gas emissions and the almost saturation of environmental capacity have led to a series of regional and environmental issues such as photochemical smog, acid rain and ozone depletion. Most of the exhaust gases are poorly water soluble and poor reactive, so it is difficult to control. The flue gas denitration technology used at present has problems such as large reduction dose, serious secondary pollution, and complicated operation.

SUMMARY OF THE INVENTION

The object of the present invention is to provide a visible light response silver metavanadate quantum dot/carbon nitride nanosheet/graphene hybrid aerogel and its preparation and application in exhaust gas treatment.

In order to achieve the above object, the present invention adopts the following specific technical solutions:

A preparation method of a visible-light response hybrid aerogel, comprising the following steps:

(1) using dicyandiamide as a precursor, after two times of calcinations, preparing carbon nitride nanosheets;

(2) dispersing carbon nitride nanosheets in water and growing silver metavanadate quantum dots in situ to prepare silver metavanadate quantum dot/carbon nitride nanosheet composites;

(3) carrying out hydrothermal reaction of silver metavanadate quantum dot/carbon nitride nanosheet composite with graphene oxide, followed by freeze-drying to prepare silver metavanadate quantum dots/carbon nitride nanosheets/graphene hybrid aerogel, which is a visible-light response hybrid aerogel.

The present invention also discloses a preparation method of silver metavanadate quantum dot/carbon nitride nanosheet composites, comprising the following steps:

(1) using dicyandiamide as a precursor, after two times of calcinations, preparing carbon nitride nanosheets;

(2) dispersing carbon nitride nanosheets in water and growing silver metavanadate quantum dots in situ to prepare silver metavanadate quantum dot/carbon nitride nanosheet composites.

The present invention also discloses a method for waste gas treatment, comprising the following steps:

(1) using dicyandiamide as a precursor, after two times of calcinations, preparing carbon nitride nanosheets;

(2) dispersing carbon nitride nanosheets in water and growing silver metavanadate quantum dots in situ to prepare silver metavanadate quantum dot/carbon nitride nanosheet composites;

(3) carrying out hydrothermal reaction of silver metavanadate quantum dot/carbon nitride nanosheet composite with graphene oxide, followed by freeze-drying to prepare silver metavanadate quantum dots/carbon nitride nanosheets/graphene hybrid aerogel, which is a visible-light response hybrid aerogel;

(4) passing the waste gas through the visible-light response hybrid aerogel, illuminating to complete the treatment of the waste gas.

The preparation method of the visible light-responsive hybrid aerogel of the present invention can be exemplified as follows:

(1) using dicyandiamide as a precursor and calcinating two times in a tube furnace to obtain ultrathin carbon nitride nanosheets;

(2) dispersing carbon nitride nanosheets in deionized water, adding silver nitrate and ammonium metavanadate successively, and in situ growing silver metavanadate quantum dots on carbon nitride, after washing, centrifuging and drying to obtain silver metavanadate quantum dot/carbon nitride nanosheet composite;

(3) The silver metavanadate quantum dot/carbon nitride nanosheet composite material and the graphene oxide are hydrothermally reacted through the reaction vessel, and then freeze-dried to obtain a visible light-responsive hybrid aerogel.

In above technical solution, in the step (1), the first calcination is carried out in argon gas, the heating rate is 5° C./min during calcination, and the calcination time is 4 h, the calcination temperature is 550° C.; the second calcination is carried out in air, the calcination rate is 5° C./min, the calcination time is 2 h, and the calcination temperature is 550° C.

In above technical solution, in the step (2), the mass ratio of carbon nitride, silver nitrate and ammonium metavanadate is (18-22):(1~2):(0.5 to 1), preferably 20:2:1; in situ growth is carried out in the dark, the time of in situ growth is 8~12 h, the temperature of in situ growth is room temperature. Preferably, after dispersing the carbon nitride nanosheets in deionized water, adding silver nitrate and stirring for 30 min, then adding ammonium metavanadate and continue stirring. Further preferably, the product is successively washed with deionized water and ethanol and then dried to prepare a silver metavanadate quantum dot/carbon nitride nanosheet composite; preferably, the drying temperature is 60 to 90° C. The formed silver metavanadate has a small nanometer size and is uniformly loaded on the surface of the carbon nitride carrier, which facilitates efficient catalytic treatment of the exhaust gas.

In above technical solution, in step (3), the mass ratio of the silver metavanadate quantum dot/carbon nitride nanosheet composite to graphene oxide is (4 to 5):(1 to 2), preferably 3:1; the temperature of the hydrothermal reaction is 95° C., the reaction time is 6 h; the temperature of freeze drying is −50° C., and the time of freeze drying is 24 h.

The present invention further discloses the application of the above silver metavanadate quantum dot/carbon nitride nanosheet/graphene hybrid aerogel composite material in photocatalytic treatment of waste gas; the application of the silver metavanadate quantum dots/carbon nitride nanosheets in photocatalytic treatment of waste gas; the application of carbon nitride nanosheets in photocatalytic treatment of waste gas. Preferably, the waste gas treatment is flue gas denitration or nitric oxide waste gas treatment.

Advantages of the Present Invention

1. The invention adopts a simple and easy-to-operate hydrothermal method and freeze-drying method to obtain the silver metavanadate quantum dots/carbon nitride nanosheets/graphene hybrid aerogel composite photocatalyst, which has simple preparation process and low cost raw materials. It is easy to achieve large-scale production; carbon nitride has a band gap of about 2.7 eV and has high visible light photocatalytic performance; however, the prior art shows that photogenerated electrons and holes are easily recombined due to its narrow band gap. The invention modifies silver metavanadate quantum dots on carbon nitride to form a zero-dimensional/two-dimensional heterojunction, which inhibits the recombination of electron-hole pairs, and exerts synergistic redox effect; three-dimensional aerogels obtained after freeze-drying have a regular geometry and are not easily blown in the air and are easy to recycle.

2. The silver metavanadate quantum dots/carbon nitride nanosheets/graphene hybrid aerogel composite photocatalyst of the invention has a large specific surface area, uniform pore diameter and excellent electrical conductivity. The silver metavanadate quantum dots are adjustable in size, high in light stability, and can be uniformly loaded on carbon nitride nanosheets to disperse charge and promote transfer of photogenerated carriers; silver metavanadate quantum dots/carbon nitride nanosheets are uniformly dispersed on the graphene, which further promotes the transfer of photogenerated carriers, so that the fluorescence intensity of the system is significantly reduced. The gradual modification of the carbon nanosheets greatly enhances the ability of the photocatalytic treatment of exhaust gas.

3. The invention overcomes the problems of large reduction dose, serious secondary pollution and complicated operation in the treatment of exhaust gas by the traditional flue gas denitration technology. The photocatalytic oxidation method has mild reaction conditions, low energy consumption and high removal efficiency, which has been widely used in the field of pollutant degradation.

DETAILED DESCRIPTION OF THE INVENTION

Embodiment 1

Figure 1:
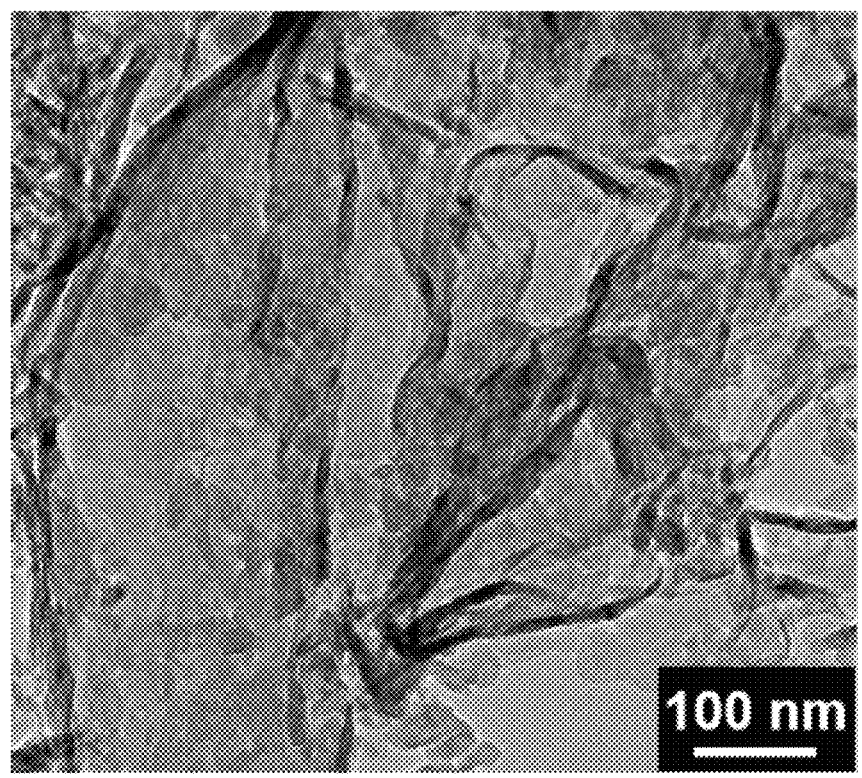
FIG. 1 is a Transmission electron microscopy image of the carbon nitride nanosheet.

The preparation of carbon nitride nanosheets, the steps are as follows:

10 g of dicyandiamide is placed in a tube furnace and calcined under Ar gas atmosphere, and then heated to 550° C. for 4 h at a heating rate of 5° C./min to obtain the bulk carbon nitride; the bulk carbon nitride is calcined in air, and heated to 550° C. for 2 h at a heating rate of 5° C./min. The present invention uses calcination to obtain carbon nitride nanosheets with a large specific surface area. FIG. 1 is a Transmission electron microscopy image of the carbon nitride nanosheet.

Embodiment 2

Figure 2:
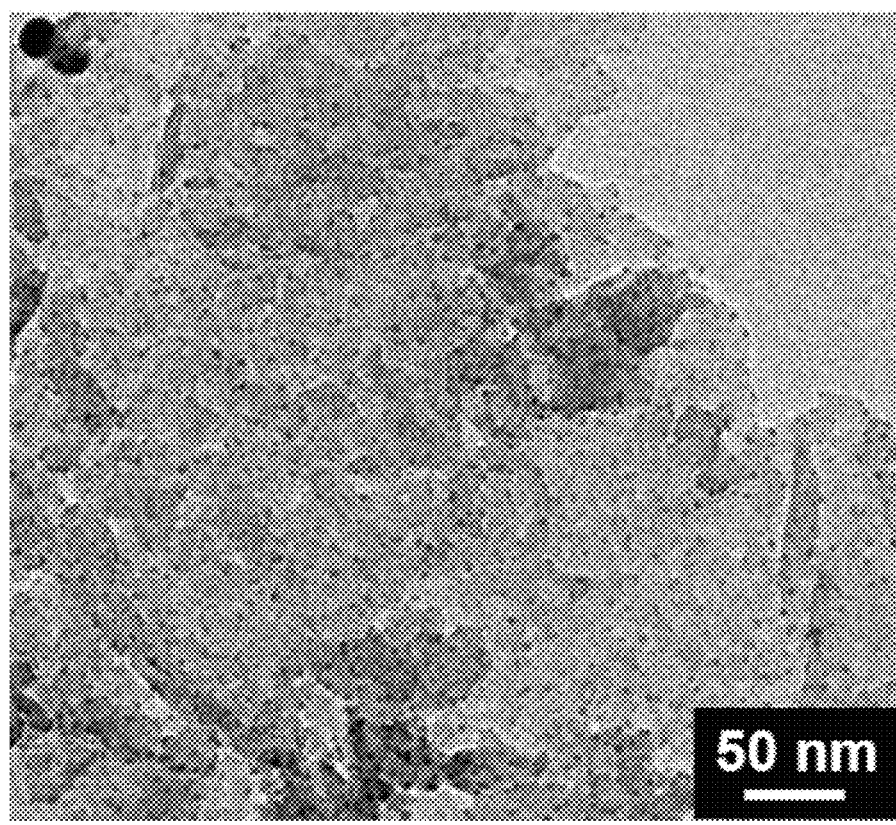
FIG. 2 is a Transmission electron microscopy image of silver metavanadate quantum dots/carbon nitride nanosheets.

The preparation of silver metavanadate quantum dots/carbon nitride nanosheets is as follows:

Silver nitrate (0.0170 g, 0.1 mmol) is dissolved in 20 ml of deionized water using a foil-wrapped beaker, and then carbon nitride nanosheets (0.1 g) is added to the solution and stirred for 30 minutes, the obtained suspension is then sonicated for 1 hour. 20 ml of ammonium metavanadate aqueous solution (0.0117 g, 0.1 mmol) is added to the suspension by a disposable syringe (20 ml) at a rate of 60 ml/h, and then the pH is adjusted to neutral and sonicated for 1 hour, and stirred in an oil bath for 8 hours. Finally, it is washed three times with deionized water and absolute ethanol. The product is placed in an oven at 80° C. for 8 h to prepare silver metavanadate quantum dots/carbon nitride nanosheets, which is recorded as AVO-CN. According to the quality of the added carbon nitride nanosheets, the composite materials with different loading quality of silver vanadate can be obtained, such as $AVO_{10}$-CN (loading mass of silver vanadate is 10 wt %), $AVO_{20}$-CN, $AVO_{30}$-CN, $AVO_{40}$-CN; FIG. 2 shows the Transmission electron microscopy image of silver metavanadate quantum dots/carbon nitride nanosheets.

Embodiment 3

Figure 3:
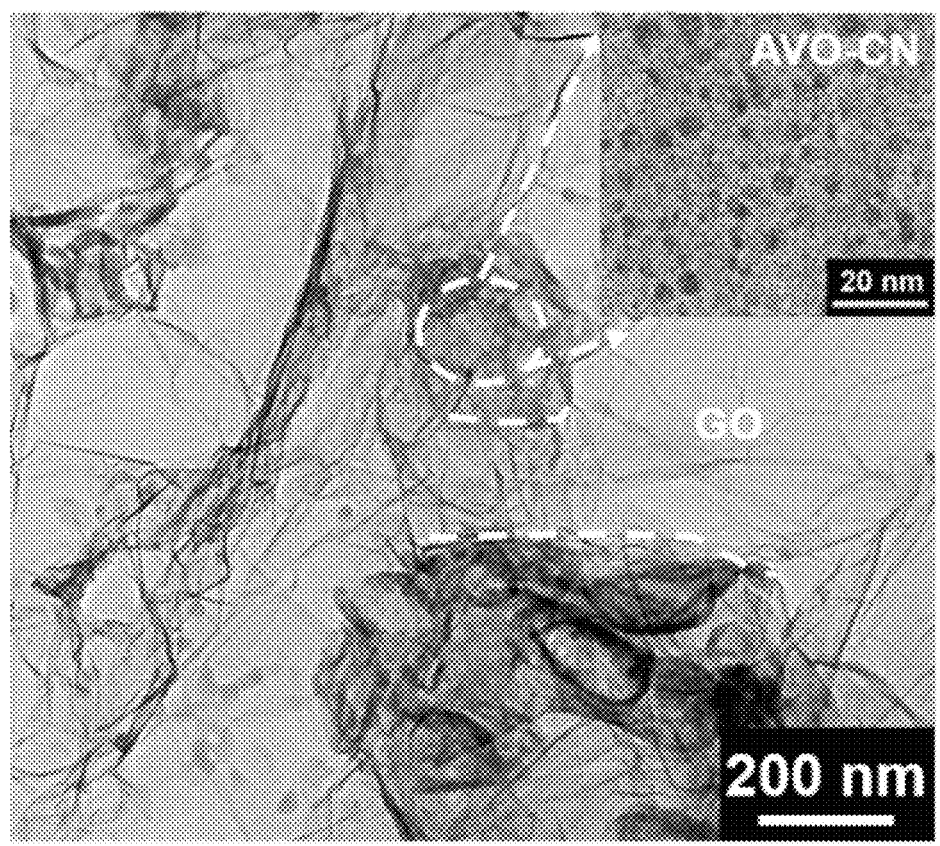
FIG. 3 is a Transmission electron microscopy image of silver metavanadate quantum dots/carbon nitride nanosheets/graphene hybrid aerogel.
Figure 4:
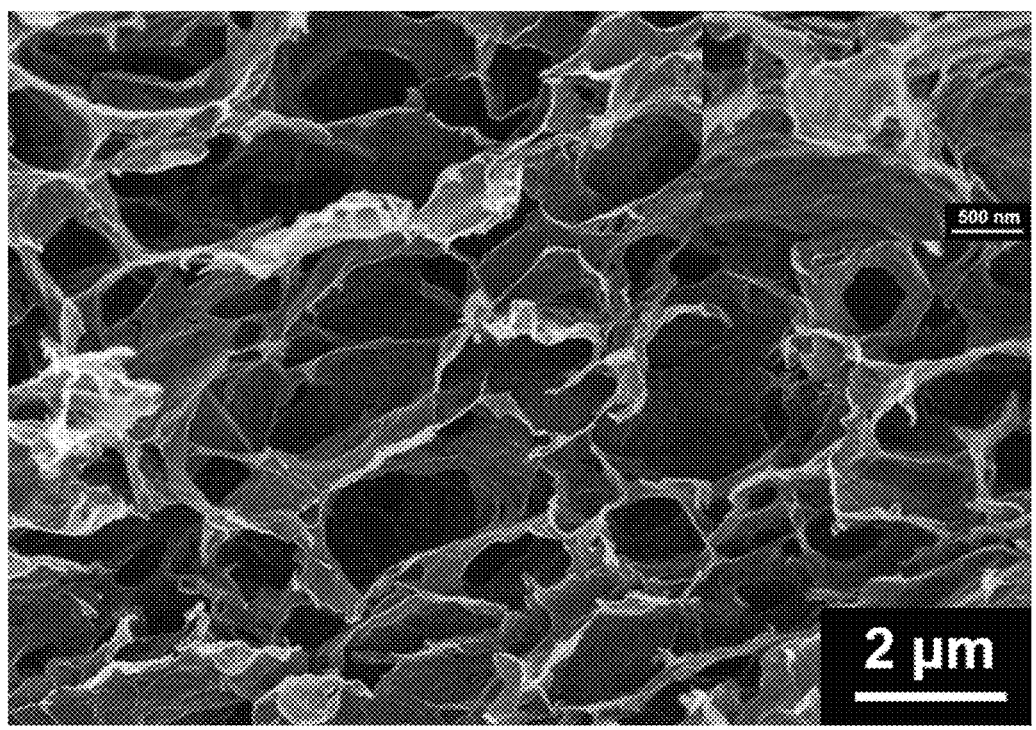
FIG. 4 is a Scanning electron microscopy image of the silver metavanadate quantum dots/carbon nitride nanosheets/graphene hybrid aerogel.

Preparation of silver metavanadate quantum dots/carbon nitride nanosheets/graphene hybrid aerogel is as follows:

15 mg of graphene oxide is added to a glass bottle (20 ml) and 4 ml of water is added thereto to uniformly disperse, then 45 mg of $AVO_{30}$-CN is added to the graphene oxide dispersion. After ultrasonic mixing, 30 mg of L-ascorbic acid is added, and the mixture is placed in boiling water for half an hour to form a hydrogel and immediately frozen in a −40° C. refrigerator for 40 min. After natural melting, it is placed in a boiling water bath for 8 hours, and finally freeze-dried in a freeze dryer for two days to obtain a regular shape of light aerogel hybrid silver metavanadate quantum dots/carbon nitride nanosheets/graphene, which is denoted as $AVO_{30}$-CN-GA-75 ($AVO_{30}$-CN mass fraction is 75 wt %). According to the quality of the addition of graphene oxide, aerogel with different $AVO_{30}$-CN mass loading can be prepared, denoted as $AVO_{30}$-CN-GA-50, $AVO_{30}$-CN-GA-75, $AVO_{30}$-CN-GA-90. FIG. 3 shows the Transmission electron microscopy image of silver metavanadate quantum dots/carbon nitride nanosheets/graphene hybrid aerogel; FIG. 4 is a Scanning electron microscopy image of the silver metavanadate quantum dots/carbon nitride nanosheets/graphene hybrid aerogel.

Embodiment 4

Figure 5:
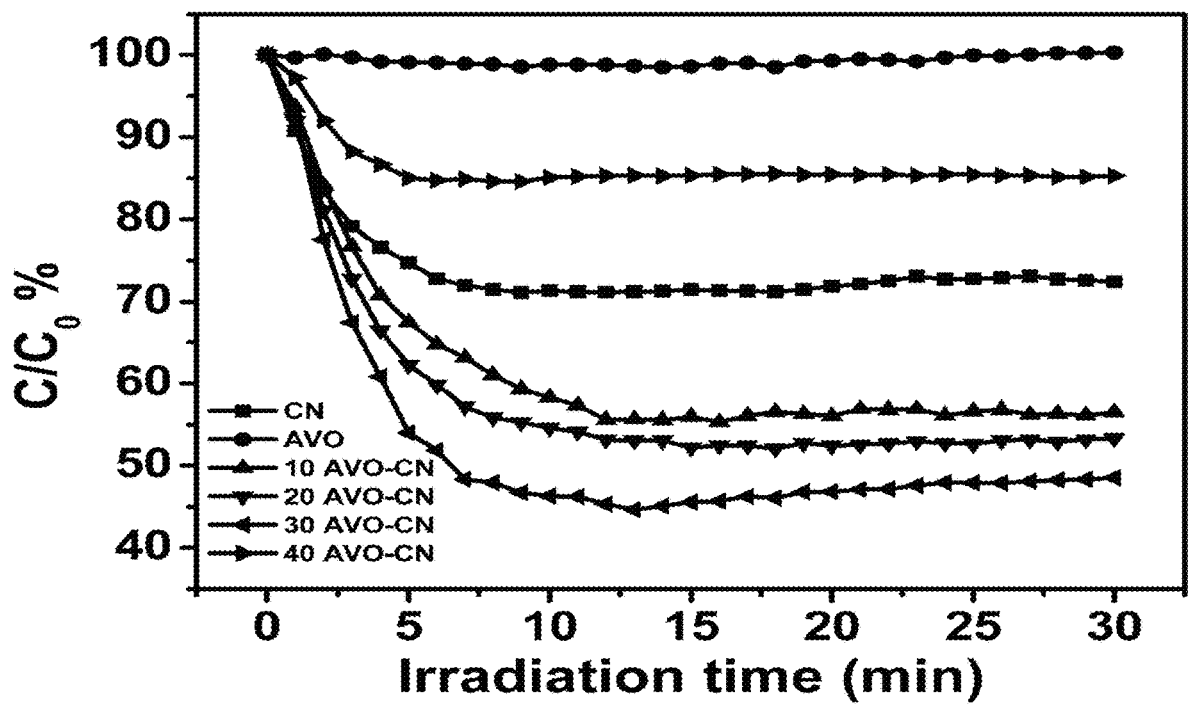
FIG. 5 is a catalytic effect diagram of silver metavanadate quantum dots/carbon nitride nanosheets/graphene hybrid aerogel with different loading qualities.
Figure 6:
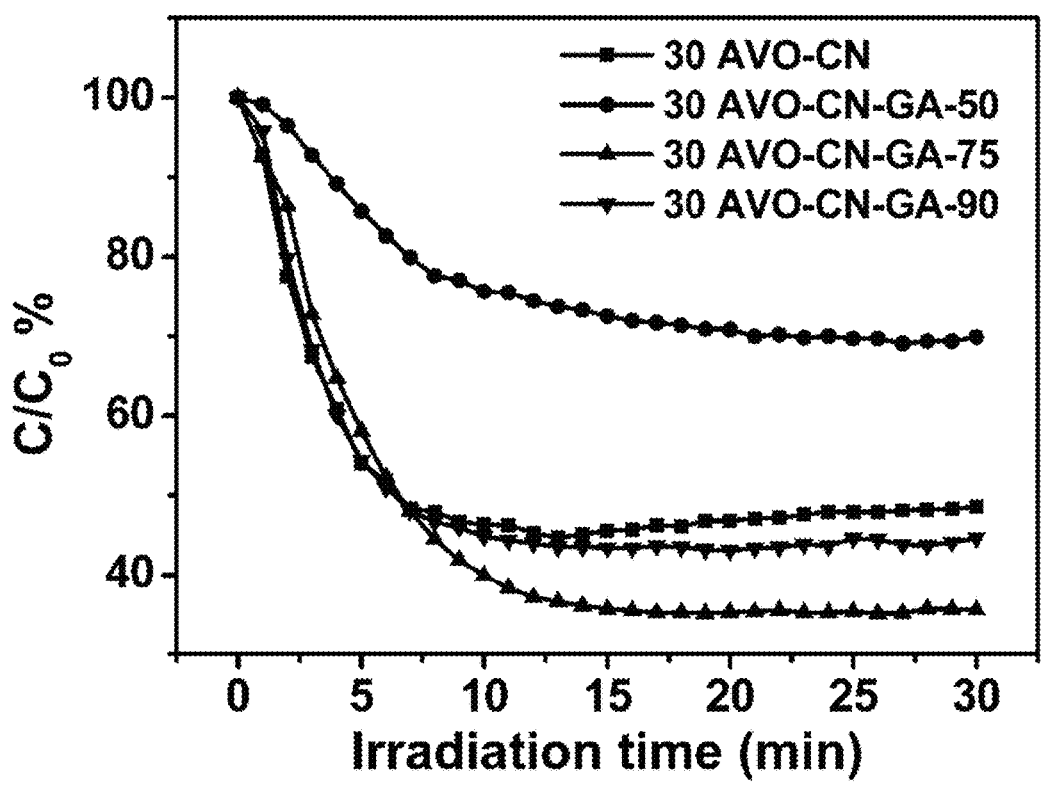
FIG. 6 is a catalytic effect diagram of silver metavanadate quantum dots/carbon nitride nanosheets/graphene hybrid aerogel with different loading qualities.
Figure 7:
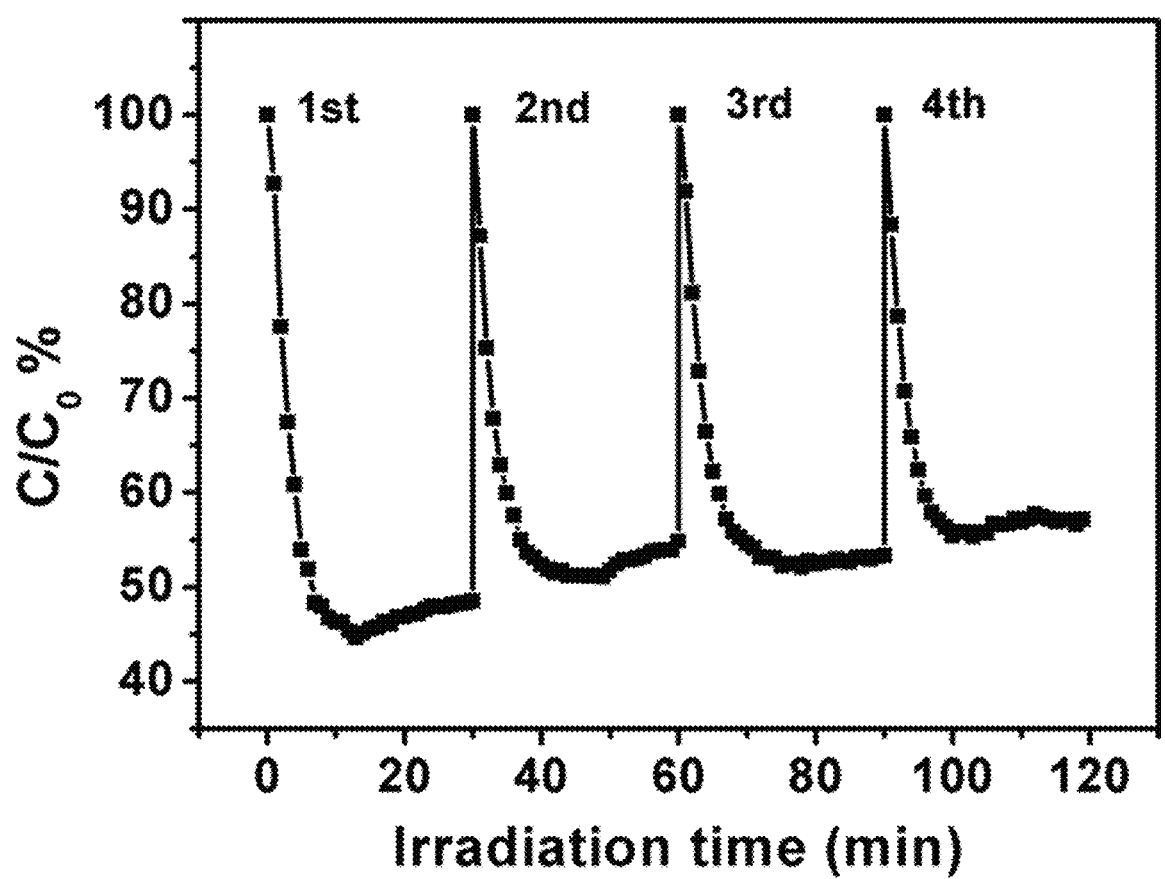
FIG. 7 is a catalytic cycle diagram of silver metavanadate quantum dots/carbon nitride nanosheets/graphene hybrid aerogel.

Photocatalytic degradation, the specific steps are as follows:

Place 50 mg of catalyst in the center of a closed cylindrical reactor with a volume of 1.6 L. The xenon lamp is placed vertically above the reactor. The nitric oxide gas is supplied from a concentrated gas cylinder, and the air flow supplied through the compressed air cylinder is diluted to 600 ppb. The two gas streams are premixed in a three-way valve with a flow rate controlled at 2.4 L/min. When the catalyst, gas and water vapor reach the adsorption-desorption equilibrium within half an hour, turn on the 300 w xenon lamp, use the NOx analyzer, the measurement time is 30 min, the concentration interval detected by the instrument is 1 min, and finally calculate the removal efficiency based on the measured concentration data. FIG. 5 and FIG. 6 show catalytic diagrams of silver metavanadate quantum dots/carbon nitride nanosheets/graphene hybrid aerogel with different loading qualities; FIG. 7 is a catalytic cycle diagram of silver metavanadate quantum dot/carbon nitride nanosheet/graphene hybrid aerogel.

The photocatalytic oxidation method of the invention has mild reaction conditions, low energy consumption, and the oxidation route is consistent with the nitrogen fixation process having a positive effect in the natural world, and thus can be widely used in the field of pollutant degradation; among them, carbon nitride is used for photocatalytic treatment of exhaust gas. It has high visible light absorption and degradation efficiency, and its modification can inhibit the recombination of electron-hole pairs and improve the catalytic efficiency.

What we claim is:

1. A preparation method of a visible-light response hybrid aerogel, comprising the following steps:
    (1) using dicyandiamide as a precursor, after a first calcination and a second calcination, preparing carbon nitride nanosheets;
    (2) dispersing carbon nitride nanosheets in water and growing silver metavanadate quantum dots in situ to prepare silver metavanadate quantum dot/carbon nitride nanosheet composites;
    (3) carrying out hydrothermal reaction of silver metavanadate quantum dot/carbon nitride nanosheet composite with graphene oxide, followed by freeze-drying to prepare silver metavanadate quantum dots/carbon nitride nanosheets/graphene hybrid aerogel, which is a visible-light response hybrid aerogel,
    wherein in the step (1), the first calcination is carried out in argon gas, a first heating rate is 5° C./min during the first calcination, and a first calcination time is 4 h, a first calcination temperature is 550° C.; and the second calcination is carried out in air, a second calcination rate is 5° C./min, a second calcination time is 2 h, and a second calcination temperature is 550° C.

2. A preparation method of silver metavanadate quantum dot/carbon nitride nanosheet composites, comprising the following steps:
    (1) using dicyandiamide as a precursor, after a first calcination and a second calcination, preparing carbon nitride nanosheets;
    (2) dispersing carbon nitride nanosheets in water and growing silver metavanadate quantum dots in situ to prepare silver metavanadate quantum dot/carbon nitride nanosheet composites,
    wherein in the step (1), the first calcination is carried out in argon gas, a first heating rate is 5° C./min during the first calcination, and a first calcination time is 4 h, a first calcination temperature is 550° C.; and the second calcination is carried out in air, a second calcination rate is 5° C./min, a second calcination time is 2 h, and a second calcination temperature is 550° C.

3. A method for exhaust gas treatment, comprising the following steps:
    (1) using dicyandiamide as a precursor, after a first calcination and a second calcination, preparing carbon nitride nanosheets;
    (2) dispersing carbon nitride nanosheets in water and growing silver metavanadate quantum dots in situ to prepare silver metavanadate quantum dot/carbon nitride nanosheet composites;
    (3) carrying out hydrothermal reaction of silver metavanadate quantum dot/carbon nitride nanosheet composite with graphene oxide, followed by freeze-drying to prepare silver metavanadate quantum dots/carbon nitride nanosheets/graphene hybrid aerogel, which is a visible-light response hybrid aerogel;
    (4) passing the exhaust gas through the visible-light response hybrid aerogel, illuminating to complete the treatment of the exhaust gas,
    wherein in the step (1), the first calcination is carried out in argon gas, a first heating rate is 5° C./min during the first calcination, and a first calcination time is 4 h, a first calcination temperature is 550° C.; and the second calcination is carried out in air, a second calcination rate is 5° C./min, a second calcination time is 2 h, and a second calcination temperature is 550° C.

4. The method according to claim 1, wherein in the step (2), dispersing the carbon nitride nanosheets in water, adding silver nitrate and ammonium metavanadate, and growing silver metavanadate quantum dots in situ; the mass ratio of carbon nitride, silver nitrate and ammonium metavanadate is (18-22):(1~2):(0.5 to 1); in situ growth is carried out in the dark, the time of in situ growth is 8~12 h, the temperature of in situ growth is room temperature.

5. The method according to claim 4, wherein after dispersing the carbon nitride nanosheets in deionized water, adding silver nitrate and stirring for 30 min, then adding ammonium metavanadate to grow silver metavanadate quantum dots in situ, the mass ratio of carbon nitride, silver nitrate and ammonium metavanadate is 20:2:1.

6. The method according to claim 1, wherein in step (3), the mass ratio of the silver metavanadate quantum dot/carbon nitride nanosheet composite to graphene oxide is (4 to 5):(1 to 2); the temperature of the hydrothermal reaction is 95° C., the reaction time is 6 h; the temperature of freeze drying is −50° C., and the time of freeze drying is 24 h.

7. The method according to claim 6, wherein the mass ratio of the silver metavanadate quantum dot/carbon nitride nanosheet composite to graphene oxide is 3:1.

8. The visible-light response hybrid aerogel prepared by the preparation method of a visible-light response hybrid aerogel according to claim 1.

9. The application of the visible-light response hybrid aerogel according to claim 8 in the photocatalytic treatment of exhaust gas.

10. The method according to claim 2, wherein in the step (2), dispersing the carbon nitride nanosheets in water, adding silver nitrate and ammonium metavanadate, and growing silver metavanadate quantum dots in situ; the mass ratio of carbon nitride, silver nitrate and ammonium metavanadate is (18-22):(1~2):(0.5 to 1); in situ growth is carried out in the dark, the time of in situ growth is 8~12 h, the temperature of in situ growth is room temperature.

11. The method according to claim 3, wherein in the step (2), dispersing the carbon nitride nanosheets in water, adding silver nitrate and ammonium metavanadate, and growing silver metavanadate quantum dots in situ; the mass ratio of carbon nitride, silver nitrate and ammonium metavanadate is (18-22):(1~2):(0.5 to 1); in situ growth is carried out in the dark, the time of in situ growth is 8~12 h, the temperature of in situ growth is room temperature.

12. The method according to claim 10, wherein after dispersing the carbon nitride nanosheets in deionized water, adding silver nitrate and stirring for 30 min, then adding ammonium metavanadate to grow silver metavanadate quantum dots in situ, the mass ratio of carbon nitride, silver nitrate and ammonium metavanadate is 20:2:1.

13. The method according to claim 11, wherein after dispersing the carbon nitride nanosheets in deionized water, adding silver nitrate and stirring for 30 min, then adding ammonium metavanadate to grow silver metavanadate quantum dots in situ, the mass ratio of carbon nitride, silver nitrate and ammonium metavanadate is 20:2:1.

14. The method according to claim 3, wherein in step (3), the mass ratio of the silver metavanadate quantum dot/carbon nitride nanosheet composite to graphene oxide is (4 to 5):(1 to 2); the temperature of the hydrothermal reaction is 95° C., the reaction time is 6 h; the temperature of freeze drying is −50° C., and the time of freeze drying is 24 h.

15. The method according to claim 14, wherein the mass ratio of the silver metavanadate quantum dot/carbon nitride nanosheet composite to graphene oxide is 3.1.

* * * * *